(12) United States Patent
Ashworth et al.

(10) Patent No.: US 11,362,798 B2
(45) Date of Patent: Jun. 14, 2022

(54) CHANNELIZATION OPTIONS FOR REDUCING NETWORK SENSITIVITY

(71) Applicant: WILSON ELECTRONICS, LLC, St. George, UT (US)

(72) Inventors: Christopher Ken Ashworth, St. George, UT (US); Dale Robert Anderson, Colleyville, TX (US); Ilesh V. Patel, Euless, TX (US)

(73) Assignee: Wilson Electronics, LLC, St. George, UT (US)

( * ) Notice: Subject to any disclaimer, the term of this patent is extended or adjusted under 35 U.S.C. 154(b) by 336 days.

(21) Appl. No.: 16/561,893

(22) Filed: Sep. 5, 2019

(65) Prior Publication Data
US 2020/0084013 A1  Mar. 12, 2020

Related U.S. Application Data

(60) Provisional application No. 62/728,636, filed on Sep. 7, 2018.

(51) Int. Cl.
*H04B 7/155* (2006.01)
*H04L 5/14* (2006.01)
(Continued)

(52) U.S. Cl.
CPC .......... *H04L 5/14* (2013.01); *H04B 7/15* (2013.01); *H04L 49/25* (2013.01); *H04W 8/005* (2013.01); *H04W 40/12* (2013.01)

(58) Field of Classification Search
CPC .. H04L 5/14; H04L 49/25; H04B 7/15; H04B 7/15542; H04W 8/005; H04W 40/12; H04Q 1/08
See application file for complete search history.

(56) References Cited

U.S. PATENT DOCUMENTS

| 4,776,032 A | 10/1988 | Odate et al. |
| 5,187,803 A * | 2/1993 | Sohner ............... H04B 5/0018 455/3.03 |

(Continued)

FOREIGN PATENT DOCUMENTS

| EP | 1525678 B1 | 7/2008 | |
| WO | WO-2017066336 A1 * | 4/2017 | ........ H04W 52/0229 |
| WO | WO 2018/144944 A1 | 8/2018 | |

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, V1.0, Revision E.
(Continued)

*Primary Examiner* — Edan Orgad
*Assistant Examiner* — Malick A Sohrab
(74) *Attorney, Agent, or Firm* — Thorpe North & Western, LLP

(57) ABSTRACT

A technology is described for increasing signal booster gain from a weak-signal far node in the proximity of a strong-signal near node. A first splitter can be coupled to a first interface port. A first channelized switchable first-direction parallel path can be coupled to the first splitter comprising a first channelized first-direction bandpass filter for a first subset of a selected first-direction band. A first switchable first-direction parallel path coupled to the first splitter can comprise: a switchable first-direction path comprising a first bandpass filter for passing the selected first-direction band; and a second channelized switchable first-direction parallel path comprising a second channelized first-direction bandpass filter for a second subset of the selected first-direction band.

11 Claims, 10 Drawing Sheets

(51) Int. Cl.
*H04B 7/15* (2006.01)
*H04L 49/25* (2022.01)
*H04W 8/00* (2009.01)
*H04W 40/12* (2009.01)

(56) References Cited

U.S. PATENT DOCUMENTS

| | | | |
|---|---|---|---|
| 5,303,395 | A | 4/1994 | Dayani |
| 5,737,687 | A | 4/1998 | Martin et al. |
| 5,777,530 | A | 7/1998 | Nakatuka |
| 5,835,848 | A | 11/1998 | Bi et al. |
| 6,005,884 | A | 12/1999 | Cook et al. |
| 6,477,249 | B1 * | 11/2002 | Williamson .......... H04M 11/062 |
| | | | 379/394 |
| 6,711,388 | B1 | 3/2004 | Neitiniemi |
| 6,889,033 | B2 | 5/2005 | Bongfeldt |
| 6,990,313 | B1 | 1/2006 | Yarkosky |
| 7,035,587 | B1 | 4/2006 | Yarkosky |
| 7,221,967 | B2 | 5/2007 | Van Buren et al. |
| 7,369,827 | B1 * | 5/2008 | Koch ................. H04N 7/17309 |
| | | | 348/E7.07 |
| 7,974,573 | B2 | 7/2011 | Dean |
| 8,619,196 | B2 * | 12/2013 | Uchida .................... H04B 1/18 |
| | | | 348/678 |
| 10,009,090 | B2 * | 6/2018 | Dussmann ............ H04W 24/08 |
| 10,009,956 | B1 * | 6/2018 | Feher .................... H04W 4/029 |
| 2002/0044594 | A1 | 4/2002 | Bongfeldt |
| 2003/0123401 | A1 | 7/2003 | Dean |
| 2004/0137854 | A1 | 7/2004 | Ge |
| 2004/0146013 | A1 | 7/2004 | Song et al. |
| 2004/0166802 | A1 | 8/2004 | McKay, Sr. et al. |
| 2004/0219876 | A1 | 11/2004 | Baker et al. |
| 2004/0235417 | A1 | 11/2004 | Dean |
| 2005/0118949 | A1 | 6/2005 | Allen et al. |
| 2006/0084379 | A1 | 4/2006 | O'Neill |
| 2007/0071128 | A1 | 3/2007 | Meir et al. |
| 2007/0188235 | A1 | 8/2007 | Dean |
| 2008/0081555 | A1 | 4/2008 | Kong et al. |
| 2008/0096483 | A1 | 4/2008 | Van Buren et al. |
| 2008/0278237 | A1 | 11/2008 | Blin |
| 2009/0011736 | A1 * | 1/2009 | Malasani ................. H04B 1/18 |
| | | | 455/307 |
| 2011/0151775 | A1 | 6/2011 | Kang et al. |
| 2016/0198347 | A1 * | 7/2016 | Zhan ........................ H04B 1/40 |
| | | | 455/23 |
| 2017/0111864 | A1 * | 4/2017 | Ashworth ......... H04W 52/0229 |
| 2017/0237182 | A1 * | 8/2017 | Tran ...................... H01Q 1/288 |
| | | | 343/853 |
| 2018/0219609 | A1 | 8/2018 | Ashworth |
| 2019/0393973 | A1 * | 12/2019 | Magri ................. H04J 14/0291 |

OTHER PUBLICATIONS

ADL5513; "1 MHz to 4 GHz, 80 dB Logarithmic Detector/ Controller"; Data Sheet; (2008); 12 pages; Analog Devices, Inc.
European Search Report Application No. 19195544.2-1220 dated Jan. 28, 2020, 8 Pages.
HMC713LP3E; "54 dB, Logarithmic Detector / Controller, 50—8000 MHz"; Data Sheet; (2010); 12 pages.
HMC909LP4E; "RMS Power Detector Single-Ended, DC—5.8 GHz"; Data Sheet; (2010); 21 pages.
PIC16F873; "28/40-Pin 8-Bit CMOS Flash Microcontrollers"; (2001); Data Sheet; 218 pages.

* cited by examiner

CHANNELIZATION OPTIONS FOR REDUCING NETWORK SENSITIVITY

RELATED APPLICATIONS

The present application claims the benefit of U.S. Provisional Patent Application No. 62/728,636 filed Sep. 7, 2018, the entire specification of which is hereby incorporated by reference in its entirety for all purposes.

BACKGROUND

Signal boosters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via the antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
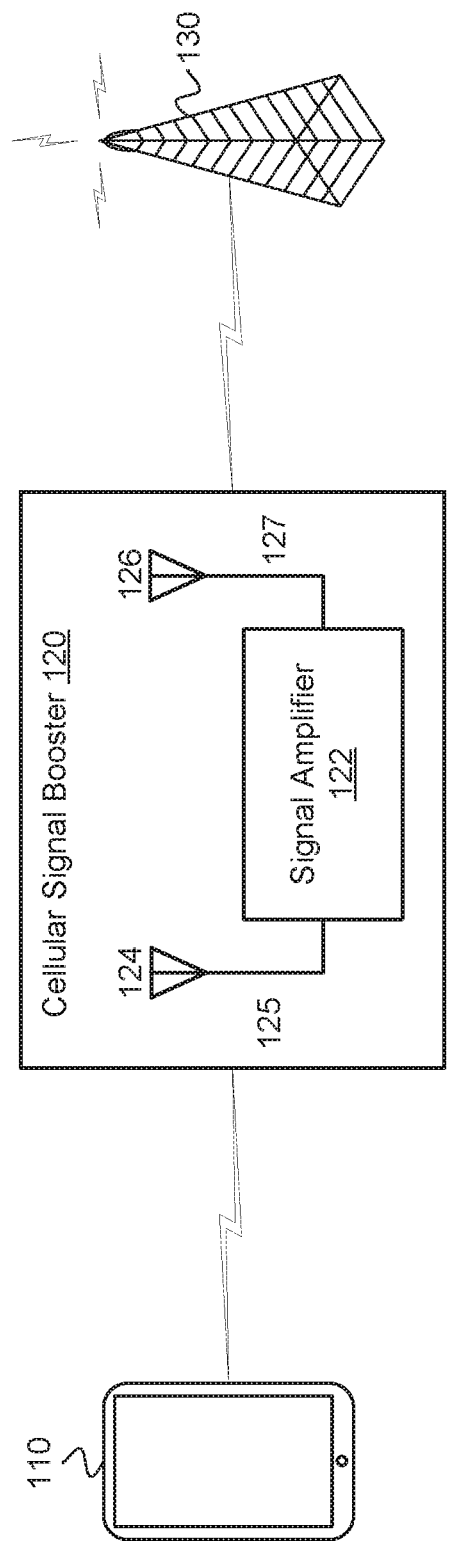
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated node antenna 126 can communicate the uplink signal that has been amplified and filtered to a node, such as base station 130.

In one example, the signal booster 120 can send uplink signals to a node and/or receive downlink signals from the node. While FIG. 1 shows the node as a base station 120, this is not intended to be limiting. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve may be attached to the wireless device 110, but may be removed as needed. In this configuration, the signal booster 120 can automatically power down or cease amplification when the wireless device 110 approaches a particular base station. In other words, the signal booster 120 may determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the handheld booster can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in 47 CFR Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, 13, 14, or 15 standards or Institute of Electronics and Electrical Engineers (IEEE) 802.16. In one configuration, the signal booster 120 can boost signals for 3GPP LTE Release 13.0.0 (March 2016) or other desired releases. The signal booster 120 can boost signals from the 3GPP Technical Specification 36.101 (Release 12 Jun. 2015) bands or LTE frequency bands. For example, the signal booster 120 can boost signals from the LTE frequency bands: 2, 4, 5, 12, 13, 17, 25, and 26. In addition, the signal booster 120 can boost selected frequency bands based on the country or region in which the signal booster is used, including any of bands 1-70 or other bands, as disclosed in ETSI TS136 104 V13.5.0 (2016 October).

The number of LTE frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

Figure 2:
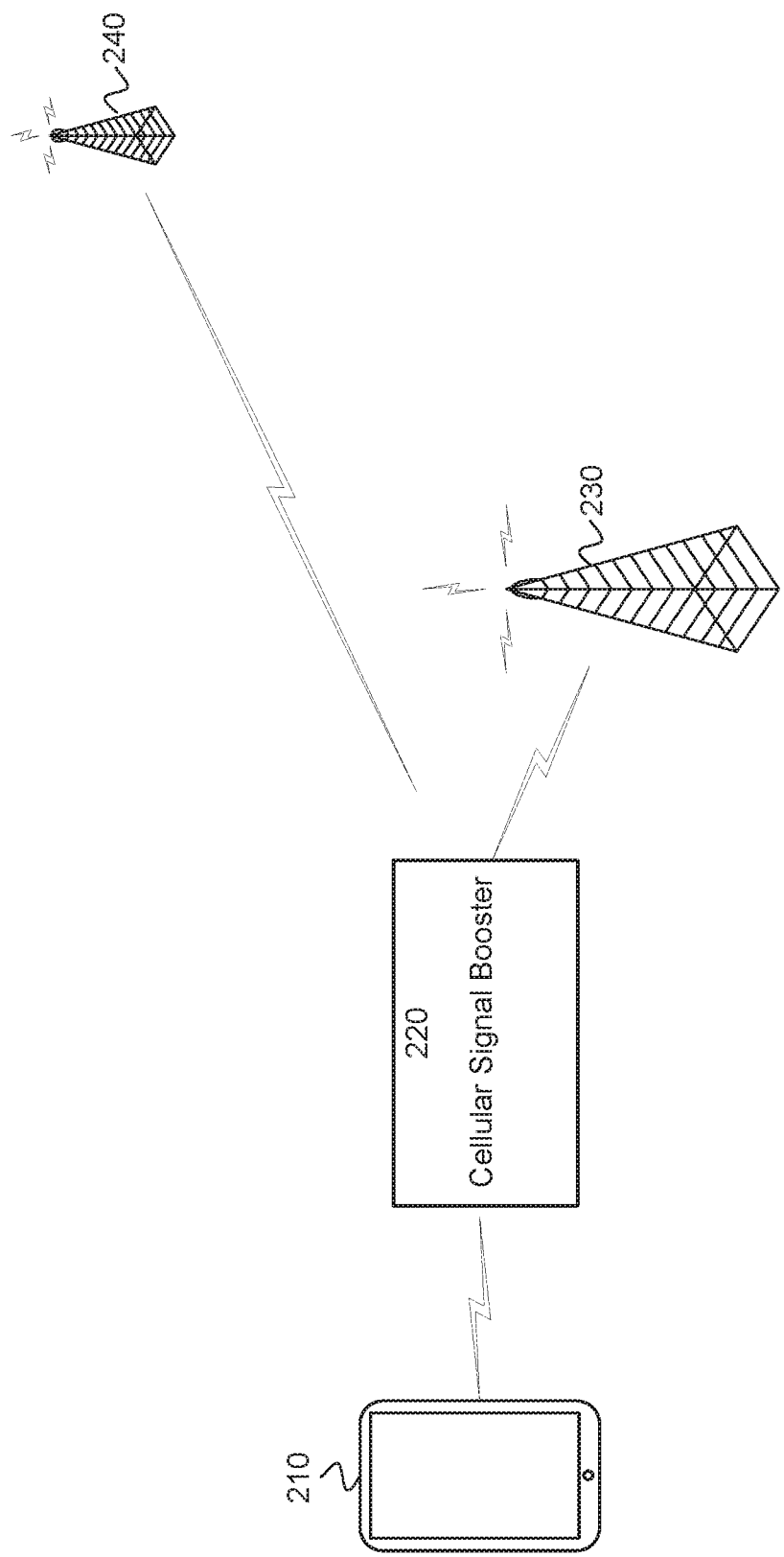
FIG. 2 illustrates a signal booster in communication with a relatively close base station and a relatively distant base station in accordance with an example.

FIG. 2 shows a wireless device 210 in communication with a signal booster 220. The signal booster can receive signals from multiple base stations, such as the relatively close base station 230 and the relatively distant base station 240.

Signal boosters 220 are typically employed to enable one or more wireless device 210 users to communicate with a relatively distant base station 240. The distant base station can be used by the user's cellular signal provider. However, another base station 230, operated by a different cellular signal provider, which is operating in the same frequency band, may be located relatively close to the signal booster 220. Downlink (DL) signals from the relatively close base station 230 will have a much higher RSSI (lower BSCL) at the signal booster 220 than the DL signals from the relatively far base station 240. The RSSI or BSCL measurements of the combined DL signals from the relatively close 230 and relatively far base stations 240 will result in significantly reduced uplink (UL) gain and/or noise power settings for the UL signals transmitted from the signal booster 220 for a user of the relatively far base station 240. If the RSSI of the DL signals from the close base station 230 are sufficiently high, it can result in the gain and/or noise power of the transmitted UL signal being set sufficiently low that the UL signal cannot be accurately received at the relatively far base station 240.

Signal boosters, such as signal booster 220, also typically provide amplification of UL signals over a fairly broad spectrum relative to a UE or MS. For example, a signal booster may provide amplification of an UL signal over an entire 3GPP LTE band. The broadband amplification of the band, and not just a single signal, results in an amplification of all of the noise in the band as well. The amplification of the noise effectively raises the noise floor for a receiver, such as a base station. In order to ameliorate the effects of increasing the noise floor, the Federal Communication Commission (FCC) in the United States has issued an order, in FCC Report and Order 13-21, that sets threshold levels for uplink gain and noise levels.

In FCC Report and Order 13-21, the transmitted noise power in dBm/MHz of consumer boosters at their uplink and downlink ports shall not exceed −103 dBm/MHz-RSSI. Where RSSI (received signal strength indication) is the downlink composite received signal power in dBm at the booster donor port for all base stations in the band of operation. RSSI is expressed in negative dB units relative to 1 mW. (2) The transmitted maximum noise power in dBm/MHz of consumer boosters at their uplink and downlink ports shall not exceed the following limits: (i) Fixed booster maximum noise power shall not exceed −102.5 dBm/MHz+ 20 Log 10 (Frequency), where Frequency is the uplink mid-band frequency of the supported spectrum bands in MHz. (ii) Mobile booster maximum noise power shall not exceed −59 dBm/MHz.

Similarly, FCC Report and Order 13-21 limits the uplink gain in dB of a consumer booster referenced to its input and output ports such that it shall not exceed −34 dB-RSSI+MSCL, where RSSI is the downlink composite received signal power in dBm at the booster donor port for all base stations in the band of operation. RSSI is expressed in negative dB units relative to 1 mW. MSCL (Mobile Station Coupling Loss) is the minimum coupling loss in dB between the wireless device and input port of the consumer booster. MSCL is to be calculated or measured for each band of operation and provided in compliance test reports.

In accordance with one embodiment, a signal booster can be configured to channelize a DL signal received at the signal booster in a selected band. Channelize, as used herein, can include filtering a selected band to pass portions of the band, or block portions of the band, to reduce the RSSI (or increase the BSCL) of one or more DL signals that cause an undesirable reduction in UL gain and/or noise power of an uplink signal for a user of the signal booster. An undesirable reduction in the UL gain and/or noise power is a reduction in the UL gain and/or noise power of the UL signal transmitted by the signal booster for the user, wherein the reduction in UL gain and/or noise power is used to protect the network (i.e. base stations) when no additional protection is actually necessary. For example, a DL signal received from a close BS may result in a relatively high RSSI. However, the booster may be boosting an UL signal for transmission to a distant BS relative to the close BS. Removing, or substantially attenuating the signal from the close BS can result in an undesirable reduction in the UL gain, while not actually protecting the distant BS since a higher power UL gain can be used to transmit to the distant BS while staying within the parameters of the FCC.

While the FCC requirements are used as an example, they are not intended to be limiting. Other governmental or industry standards may also designate limits or suggestions for UL signal gain limitations for a signal booster. By more accurately measuring DL signals, the UL signal gain can be maximized relative to the governmental or industry limits or suggestions.

In one configuration, the repeater 220 can improve the wireless connection between the wireless device 210 and the base station 230 (e.g., cell tower) or another type of wireless wide area network (WWAN) access point (AP) by amplifying desired signals relative to a noise floor. The repeater 220 can boost signals for cellular standards, such as the Third Generation Partnership Project (3GPP) Long Term Evolution (LTE) Release 8, 9, 10, 11, 12, 13, 14, 15, or 16 standards or Institute of Electronics and Electrical Engineers (IEEE) 802.16. In one configuration, the repeater 220 can boost signals for 3GPP LTE Release 16.2.0 (July 2019) or other desired releases.

The repeater 220 can boost signals from the 3GPP Technical Specification (TS) 36.101 (Release 16 Jul. 2019) bands or LTE frequency bands. For example, the repeater 220 can boost signals from the LTE frequency bands: 2, 4, 5, 12, 13, 17, 25, and 26. In addition, the repeater 220 can boost selected frequency bands based on the country or region in which the repeater is used, including any of bands 1-85 or other bands, as disclosed in 3GPP TS 36.104 V16.2.0 (July 2019), and depicted in Table 1:

TABLE 1

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 (NOTE 1) | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23[1] | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |

TABLE 1-continued

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 29 | N/A | 717 MHz-728 MHz | FDD (NOTE 2) |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD (NOTE 2) |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD (NOTE 3, NOTE 4) |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD (NOTE 8) |
| 50 | 1432 MHz-1517 MHz | 1432 MHz-1517 MHz | TDD |
| 51 | 1427 MHz-1432 MHz | 1427 MHz-1432 MHz | TDD |
| 52 | 3300 MHz-3400 MHz | 3300 MHz-3400 MHz | TDD |
| 53 | 2483.5 MHz-2495 MHz | 2483.5 MHz-2495 MHz | TDD |
| 65 | 1920 MHz-2010 MHz | 2110 MHz-2200 MHz | FDD |
| 66 | 1710 MHz-1780 MHz | 2110 MHz-2200 MHz | FDD (NOTE 5) |
| 67 | N/A | 738 MHz-758 MHz | FDD (NOTE 2) |
| 68 | 698 MHz-728 MHz | 753 MHz-783 MHz | FDD |
| 69 | N/A | 2570 MHz-2620 MHz | FDD (NOTE 2) |
| 70 | 1695 MHz-1710 MHz | 1995 MHz-2020 MHz | FDD[6] |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD (NOTE 2) |
| 76 | N/A | 1427 MHz-1432 MHz | FDD (NOTE 2) |
| 85 | 698 MHz-716 MHz | 728 MHz-746 MHz | FDD |
| 87 | 410 MHz-415 MHz | 420 MHz-425 MHz | FDD |
| 88 | 412 MHz-417 MHz | 422 MHz-427 MHz | FDD |

(NOTE 1):
Band 6, 23 are not applicable.
(NOTE 2):
Restricted to E-UTRA operation when carrier aggregation is configured. The downlink operating band is paired with the uplink operating band (external) of the carrier aggregation configuration that is supporting the configured Pcell.
(NOTE 3):
This band is an unlicensed band restricted to licensed-assisted operation using Frame Structure Type 3.
(NOTE 4):
Band 46 is divided into four sub-bands as in Table 5.5-1A.
(NOTE 5):
The range 2180-2200 MHz of the DL operating band is restricted to E-UTRA operation when carrier aggregation is configured.
NOTE 6:
The range 2010-2020 MHz of the DL operating band is restricted to E-UTRA operation when carrier aggregation is configured and TX-RX separation is 300 MHz. The range 2005-2020 MHz of the DL operating band is restricted to E-UTRA operation when carrier aggregation is configured and TX-RX separation is 295 MHz.
(NOTE 7):
Void
(NOTE 8):
This band is restricted to licensed-assisted operation using Frame Structure Type 3.

In another configuration, the repeater 220 can boost signals from the 3GPP Technical Specification (TS) 38.104 (Release 16 Jul. 2019) bands or 5G frequency bands. In addition, the repeater 220 can boost selected frequency bands based on the country or region in which the repeater is used, including any of bands n1-n86 in frequency range 1 (FR1), n257-n261 in frequency range 2 (FR2), or other bands, as disclosed in 3GPP TS 38.104 V16.0.0 (July 2019), and depicted in Table 2 and Table 3:

TABLE 2

| NR operating band | Uplink (UL) operating band BS receive/UE transmit $F_{UL,low}$-$F_{UL,high}$ | Downlink (DL) operating band BS transmit/UE receive $F_{DL,low}$-$F_{DL,high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n48 | 3550 MHz-3700 MHz | 3550 MHz-3700 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| [n90] | 2496 MHz-2690 MHz | 2496 MHz-2690 MHz | TDD |

TABLE 3

| NR operating band | Uplink (UL) and Downlink (DL) operating band BS transmit/receive UE transmit/receive $F_{UL,low}$-$F_{UL,high}$ $F_{DL,low}$-$F_{DL,high}$ | Duplex Mode |
|---|---|---|
| n257 | 26500 MHz-29500 MHz | TDD |
| n258 | 24250 MHz-27500 MHz | TDD |
| n260 | 37000 MHz-40000 MHz | TDD |
| n261 | 27500 MHz-28350 MHz | TDD |

Channelizing the DL and UL signals in selected bands at the signal booster can reduce interference from other DL signals from a same base station or different base stations, thereby enabling the UL signals transmitted from the signal booster for a selected user to have an increased gain and increase the range over which the selected user can communicate. In addition, channelizing the UL signal can allow filtering that will reduce the noise power transmitted to base stations and allow the signal booster to meet the specification requirements. Filtering of the UL signal can typically occur at an equivalent location (i.e. channel) as is filtered in the DL signal. For example, in an FDD band, such as 3GPP LTE band 5, if the bottom 15 MHz of the DL spectrum for 3GPP LTE band 5 is filtered to attenuate signals in those frequencies, the bottom 15 MHz of the UL spectrum for 3GPP LTE band 5 can also be similarly filtered. By filtering the UL signal, the noise floor can be effectively reduced, thereby enabling a base station, such as a 3GPP LTE eNodeB, to receive the UL signal with a lower noise floor.

Figure 3:
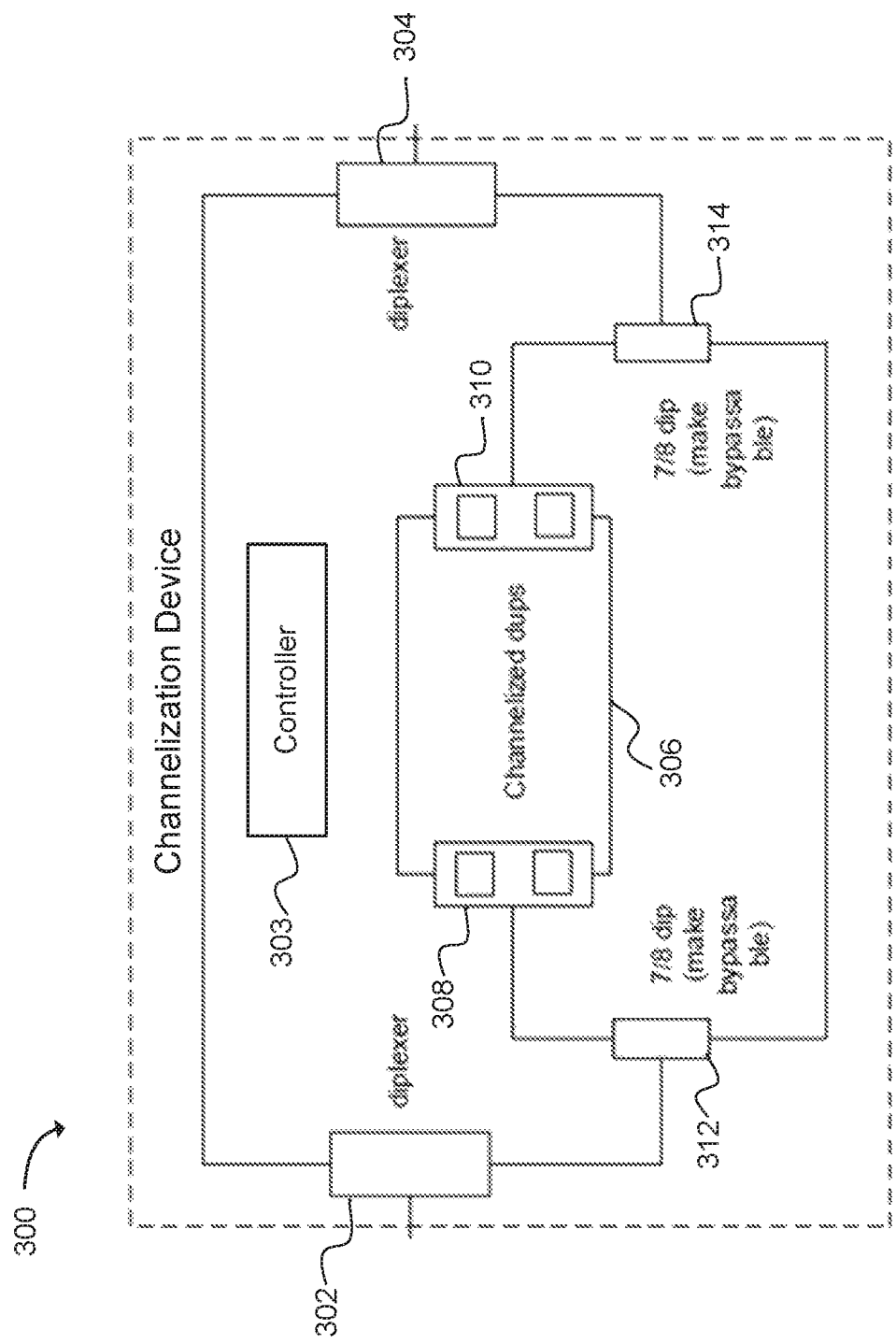
FIG. 3 illustrates a channelized box in accordance with an example.

FIG. 3 provides one example of a channelization device 300 for increasing signal booster gain at a signal booster. The channelization device 300 comprises a first diplexer 302 configured to be coupled to a first interface port and a second diplexer 304 configured to be coupled to a second interface port. In one embodiment, the first interface port can be an outside antenna, and the second interface port can be an inside antenna. The channelization device 300 can include radio frequency connections to enable the channelization device 300 to be connected to the first and/or second interface ports, or other components such as a signal booster.

The channelization device 300 can further comprise a controller 303. The channelization device 300 can further comprise a channelized filter 306. In the example illustrated in FIG. 3, the channelized filter 306 is comprised of a first channelized duplexer 308 and a second channelized duplexer 310. Switches 312, 314 can be used to create a bypass path around the channelized filter 306 to allow an uplink signal or a downlink signal to bypass the channelized filter 306.

Figure 4:
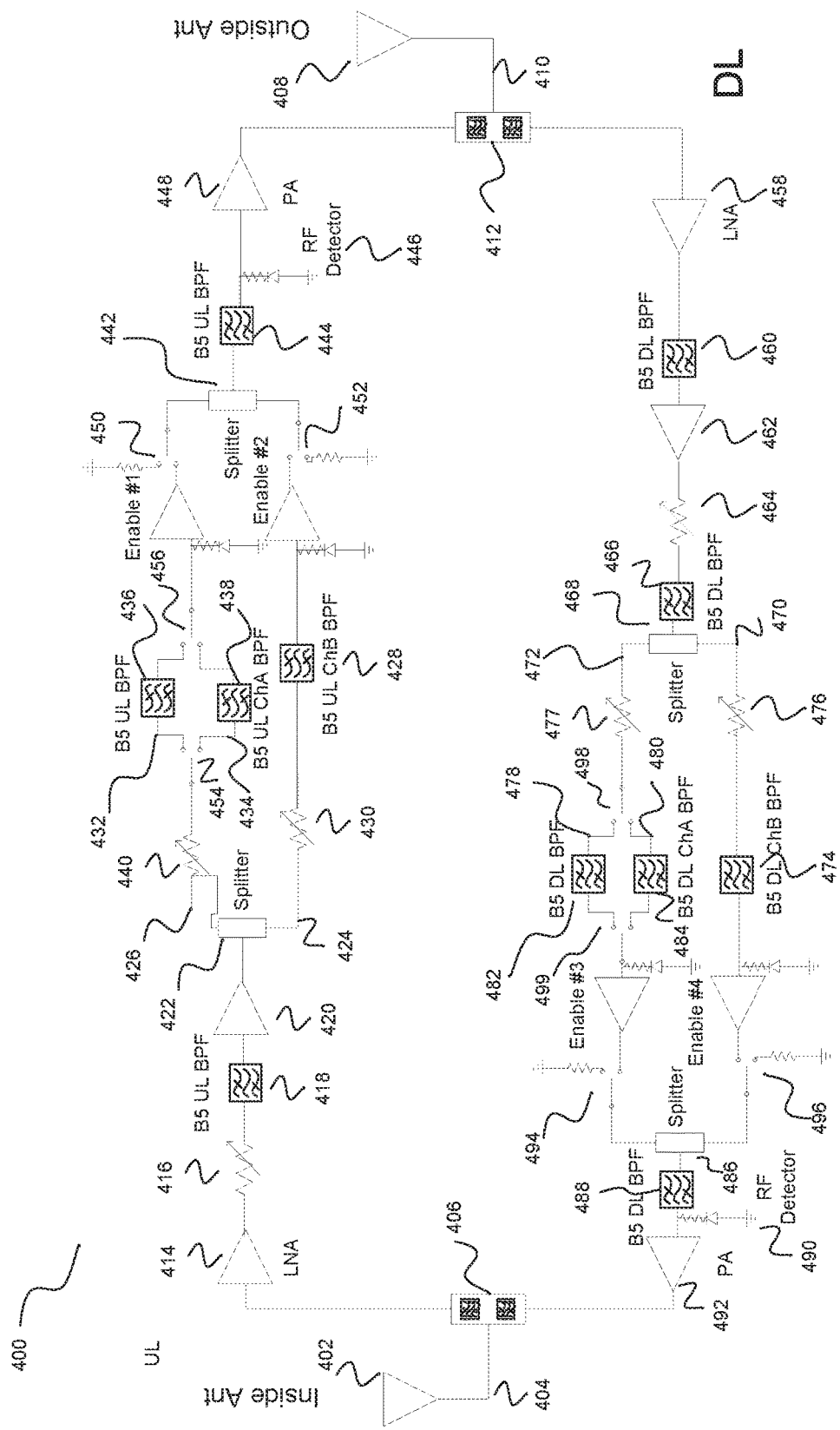
FIG. 4 illustrates a repeater for increasing signal booster gain from a weak-signal far node in the proximity of a strong-signal near node in accordance with an example.

FIG. 4 illustrates an example of a repeater 400 for increasing signal booster gain from a weak-signal far node in the proximity of a strong-signal near node. An inside antenna 402 can be coupled to a first interface port 404. The first interface port 404 can be coupled to a first duplexer 406. An outside antenna 408 can be coupled to a second interface port 410. The second interface port 410 can be coupled to a second duplexer 412.

The first duplexer 406 can pass a signal in a first direction. The first direction can be an uplink direction or a downlink direction. The first direction can include a first low noise amplifier (LNA) 414 that can be coupled to the first duplexer 406. The first LNA 414 can be coupled to a variable attenuator 416. The variable attenuator 416 can be coupled to a bandpass filter 418 that can pass a selected band of the first direction. The bandpass filter 418 can be a third generation partnership project (3GPP) long term evolution (LTE) frequency division duplex (FDD) band 5 uplink bandpass filter (B5 UL BPF). The bandpass filter 418 can be coupled to an amplifier 420.

The amplifier 420 can be coupled to a splitter 422. The splitter 422 can be a directional coupler or combiner, or can be a multiport splitter (e.g. 3-way or 4-way). The splitter can also be a hybrid coupler, such as a 90 degree hybrid coupler or a 180 degree hybrid coupler. Other types of hybrid couplers may also be used. The splitter 422 can split the first direction into two paths: a first channelized switchable first-direction parallel path 424 and a first switchable first direction parallel path 426. The first channelized switchable first-direction parallel path 424 can comprise a first channelized first-direction bandpass filter 428 for a first subset of a selected band. The selected band can be a 3GPP LTE FDD band 5 uplink. The first subset of the selected band can be channel B of the 3GPP LTE FDD band 5 uplink. The selected band can also be one or more of a 3GPP LTE band 1 to 76 uplink and 85 uplink.

The first channelized switchable first-direction parallel path 424 can further comprise a variable attenuator 430. The variable attenuator 430 can be coupled between the splitter 422 and the first channelized first-direction bandpass filter 428.

The first switchable first-direction parallel path 426 can comprise: a switchable first-direction path 432 and a second channelized switchable first-direction parallel path 434. The switchable first-direction path 432 can comprise a first bandpass filter 436 for passing the selected band. The selected band can be 3GPP LTE FDD band 5 uplink. The second channelized switchable first-direction parallel path 434 can comprise a second channelized first-direction bandpass filter 438 for a second subset of the selected band. The second subset of the selected band can be channel A of the 3GPP LTE FDD band 5 uplink.

The second channelized switchable first-direction parallel path 426 can further comprise a variable attenuator 440. The variable attenuator 440 can be coupled between the splitter 422 and the second channelized first-direction bandpass filter 438 and the first bandpass filter 436.

A second splitter 442 can be coupled between the second interface port 410 and the first bandpass filter 436, the second channelized first-direction bandpass filter 438, and the first channelized first-direction bandpass filter 428. The second splitter 442 can be coupled to an additional bandpass filter 444 configured to pass a first-direction of the selected band. The selected band can be 3GPP LTE FDD band 5 uplink. The additional bandpass filter 444 can be coupled to a radio frequency (RF) detector 446, which can be coupled to a power amplifier (PA) 448. The power amplifier 448 can be coupled to the second duplexer 412, which can be coupled to the second interface port 410.

The repeater 400 can further comprise a first switch 450 for the first switchable first-direction parallel path 426. The first switch 450 can be coupled between the second splitter 442 and the first bandpass filter 436 and the second channelized first-direction bandpass filter 438. The repeater 400 can further comprise a second switch 452 for the first channelized switchable first-direction parallel path 424. The second switch 452 can be coupled between the second splitter 442 and the first channelized first-direction bandpass filter 428.

The repeater 400 can further comprise a third switch 454. The third switch 454 can be coupled between the first splitter 422 and the first bandpass filter 436 and the second channelized first-direction bandpass filter 438. The repeater 400 can further comprise a fourth switch 456. The fourth switch 456 can be coupled between the first bandpass filter 436 and the second channelized first-direction bandpass filter 438, and the first switch 450.

The second duplexer 412 can pass a signal in a second direction. The second direction can be an uplink direction or a downlink direction. The second direction can include a low noise amplifier 458 that can be coupled to a bandpass filter 460. The bandpass filter 460 can pass a second direction of a selected band. The selected band can be a 3GPP LTE band 5 downlink. The selected band can also be one or more of a 3GPP LTE band 1 to 76 downlink and 85 downlink. The bandpass filter 460 can be coupled to an amplifier 462 which can be coupled to a variable attenuator 464 and an additional bandpass filter 466. The additional bandpass filter 466 can pass a second direction of the selected band and can be coupled to a first second-direction splitter 468.

The first second-direction splitter 468 can be a directional coupler or combiner, and can be a multiport splitter (e.g. 3-way or 4-way). The splitter 468 can split the second direction into two paths: a first channelized switchable second-direction parallel path 470 and a first switchable second-direction parallel path 472. The first channelized switchable second-direction parallel path 470 can be coupled to the first second-direction splitter 468, and the first channelized switchable second-direction parallel path 470 can comprise a first channelized second-direction filter 474 for a first subset of the selected band. The selected band can be a 3GPP LTE FDD band 5 downlink. The first subset of the selected band can be channel B of the 3GPP LTE FDD band 5 downlink.

The first channelized switchable second-direction parallel path 470 can further comprise a variable attenuator 476. The variable attenuator 476 can be coupled between the first second-direction splitter 468 and the first channelized second-direction bandpass filter 474.

The first switchable second-direction parallel path 472 can comprise: a switchable second-direction path 478 and a second channelized switchable second-direction parallel path 480. The switchable second-direction path 478 can comprise a second bandpass filter 482 for passing the selected band. The selected band can be 3GPP LTE FDD band 5 downlink. The second channelized switchable second-direction parallel path 480 can comprise a second channelized second-direction bandpass filter 484 for a second subset of the selected band. The second subset of the selected band can be channel A of the 3GPP LTE FDD band 5 downlink.

The first switchable second-direction parallel path 472 can further comprise a variable attenuator 477. The variable attenuator 477 can be coupled between the first second-direction splitter 468, the second bandpass filter 482, and the second channelized second-direction bandpass filter 484.

A second second-direction splitter 486 can be coupled between the first interface port 404 and the first channelized second-direction bandpass filter 474, the second bandpass filter 482, and the second channelized second-direction bandpass filter 484. The second second-direction splitter 486 can be coupled to an additional bandpass filter 488 configured to pass a second-direction of the selected band. The selected band can be 3GPP LTE FDD band 5 downlink. The additional bandpass filter 488 can be coupled to an RF detector 490, which can be coupled to a power amplifier 492. The power amplifier 492 can be coupled to the first duplexer 406, which can be coupled to the first interface port 404.

The repeater 400 can further comprise a first second-direction switch 494 for the first switchable second-direction parallel path 472. The first second-direction switch 494 can be coupled between the second second-direction splitter 486 and the second bandpass filter 482 and the second channelized second-direction bandpass filter 484. The repeater 400 can further comprise a second second-direction switch 496 for the first channelized switchable second-direction parallel path 470. The second second-direction switch 496 can be coupled between the second second-direction splitter 486 and the first channelized second-direction bandpass filter 474.

The repeater 400 can further comprise a third second-direction switch 498. The third second-direction switch 498 can be coupled between the first second-direction splitter 468 and the second bandpass filter 482 and the second channelized second-direction bandpass filter 484. The repeater 400 can further comprise a fourth second-direction switch 499. The fourth second-direction switch 499 can be coupled between the second bandpass filter 482 and the second channelized second-direction bandpass filter 484, and the first second-direction switch 494.

The repeater 400 can operate in wideband mode or parallel channelized mode. Wideband mode can be used by disabling the Channel B path (i.e. the path with the B5 UL ChB BPF and the B5 DL ChB BPF) and switching into the wideband BPF (i.e. B5 UL BPF and B5 DL BPF). The received signal strength indicator (RSSI) of channel A and channel B can be identified separately by disabling the undesired channel during signal detection. Alternatively, separate detectors can be used on each signal path. The switches in the repeater 400 can be one method of maintaining impedance matching to the splitter if any of Enable 1 through 4 are disabled.

Figure 5:
FIG. 5 illustrates a repeater for increasing signal booster gain from a weak-signal far node in the proximity of a strong-signal near node in accordance with an example.

FIG. 5 illustrates an example of a repeater 500 for increasing signal booster gain from a weak-signal far node in the proximity of a strong-signal near node. An inside antenna 502 can be coupled to a first interface port 504. The first interface port 504 can be coupled to a first duplexer 506. An outside antenna 508 can be coupled to a second interface port 510. The second interface port 510 can be coupled to a second duplexer 512.

The first duplexer 506 can pass a signal in a first direction. The first direction can be an uplink direction or a downlink direction. The first direction can include a first low noise amplifier (LNA) 514a that can be coupled to the first duplexer 506. The first LNA 514a can be coupled to a variable attenuator 516a. The variable attenuator 516a can be coupled to switch 518a. The switch 518a can direct a signal onto a switchable first-direction parallel path comprising a switchable first-direction path 520a and a switchable first-direction path 522a. The switchable first-direction path 520a can comprise a bandpass filter 524a for passing a first selected first-direction band. The bandpass filter 524a can be a third generation partnership project (3GPP) long term evolution (LTE) frequency division duplex (FDD) band 5 uplink bandpass filter (B5 UL). The switchable first-direction path 522a can comprise a bandpass filter 526a for passing a second selected first-direction band. The bandpass filter 526a can be a 3GPP LTE FDD band 26 uplink bandpass filter (B26 UL). The bandpass filter 524a and the bandpass filter 526a can be coupled to a switch 528a. The switch 528a can be coupled to an amplifier 530a. The amplifier 530a can be coupled to a variable attenuator 532a.

The variable attenuator 532a can be coupled to a switch 534a. The switch 534a can be coupled to another switch 536a and a splitter 538a. The switch 536a can direct a signal onto a switchable first-direction parallel path comprising a switchable first-direction path 540a and a switchable first-direction path 542a. The switchable first-direction path 540a can comprise a bandpass filter 544a for passing a first selected first-direction band. The bandpass filter 544a can be a 3GPP LTE FDD band 5 uplink bandpass filter (B5 UL). The switchable first-direction path 542a can comprise a bandpass filter 546a for passing a second selected first-direction band. The bandpass filter 546a can be a 3GPP LTE FDD band 26 uplink bandpass filter (B26 UL). The bandpass filter 544a and the bandpass filter 546a can be coupled to a switch 548a. The switch 548a can be coupled to another switch 550a.

The splitter 538a can be a directional coupler or combiner, and can be a multiport splitter (e.g. 3-way or 4-way). The splitter 538a can split the first direction into two paths: a channelized switchable first-direction parallel path 552a and a switchable first-direction parallel path 554a. The channelized switchable first-direction parallel path 552a can comprise a channelized first-direction bandpass filter 556a for a first subset of a first selected first-direction band. The bandpass filter 556a can be a 3GPP LTE FDD band 5 channel B uplink bandpass filter (5B UL). The selected first-direction band can be a 3GPP LTE FDD band 5 uplink. The first subset of the selected first-direction band can be channel B of the 3GPP LTE FDD band 5 uplink. The bandpass filter 556a can be coupled to a power detector 558a which can be coupled to a variable attenuator 560a. The variable attenuator 560a can be coupled to a combiner 562a. The combiner 562a can be coupled to the switch 550a.

The switchable first-direction parallel path 554a can comprise a switch 555a and can further comprise a channelized switchable first-direction parallel path 564a and a switchable first-direction path 566a. The channelized switchable first-direction parallel path 564a can comprise a channelized first-direction bandpass filter 568a for a second subset of a first selected first-direction band. The bandpass filter 568a can be a 3GPP LTE FDD band 5 channel A uplink bandpass filter (5A UL). The first selected first-direction band can be a 3GPP LTE FDD band 5 uplink. The second subset of the first selected first-direction band can be channel A of the 3GPP LTE FDD band 5 uplink. The switchable first-direction path 566a can comprise a filter 570a for passing the second subset of the first selected first-direction band and a first subset of a second selected first-direction band. The filter 570a can be a 3GPP LTE FDD band 5A+26 uplink bandpass filter (5A+26 UL). The first selected first-direction band can be a 3GPP LTE FDD band 5 uplink. The second subset of the first selected first-direction band can be channel A of the 3GPP LTE FDD band 5 uplink. The second selected first-direction band can be a 3GPP LTE FDD band 26 uplink. The first subset of the second selected first-direction band can be a channel delta of the 3GPP LTE FDD band 26 uplink. 3GPP LTE FDD band 5 uplink can include the frequencies 824 megahertz (MHz) through 849 MHz. 3GPP LTE FDD band 5 channel A uplink can include the frequencies 824 MHz through 835 MHz. 3GPP LTE FDD band 5 channel B uplink can include the frequencies 835 MHz through 845 MHz. 3GPP LTE FDD band 26 uplink can include the frequencies 814 MHz through 849 MHz. Channel delta of the 3GPP LTE FDD band 26 uplink can include the frequencies 814 MHz through 824 MHz.

The bandpass filter 568a and the filter 570a can be coupled to a switch 572a. The switch 572a can be coupled to a power detector 574a which can be coupled to a variable attenuator 576a. The variable attenuator 576a can be coupled to the combiner 562a. The combiner 562a can be coupled to the switch 550a.

The switch 550a can be coupled to an amplifier 578a which can be coupled to a variable attenuator 580a. The variable attenuator 580a can be coupled to a first-direction bandpass filter 582a. The first-direction bandpass filter 582a can be a 3GPP LTE FDD band 26 uplink bandpass filter (B26 UL). The first-direction bandpass filter 582a can be coupled to a power detector 584a. The power detector 584a can be coupled to a power amplifier 586a. The power amplifier 586a can be coupled to the second duplexer 512.

The second duplexer 512 can pass a signal in a second direction. The second direction can be an uplink direction or a downlink direction. The second direction can include a low noise amplifier (LNA) 514b that can be coupled to the second duplexer 512. The LNA 514b can be coupled to a variable attenuator 516b. The variable attenuator 516b can be coupled to switch 518b. The switch 518b can direct a signal onto a switchable second-direction parallel path comprising a switchable second-direction path 520b and a switchable second-direction path 522b. The switchable second-direction path 520b can comprise a bandpass filter 524b for passing a first selected second-direction band. The bandpass filter 524b can be a third generation partnership project (3GPP) long term evolution (LTE) frequency division duplex (FDD) band 5 downlink bandpass filter (B5 DL). The switchable second-direction path 522b can comprise a bandpass filter 526b for passing a second selected second-direction band. The bandpass filter 526b can be a 3GPP LTE FDD band 26 downlink bandpass filter (B26 DL). The bandpass filter 524b and the bandpass filter 526b can be coupled to a switch 528b. The switch 528b can be coupled to an amplifier 530b. The amplifier 530b can be coupled to a variable attenuator 532b.

The variable attenuator 532b can be coupled to a switch 534b. The switch 534b can be coupled to another switch 536b and a splitter 538b. The switch 536b can direct a signal onto a switchable second-direction parallel path comprising a switchable second-direction path 540b and a switchable second-direction path 542b. The switchable second-direction path 540b can comprise a bandpass filter 544b for passing a first selected second-direction band. The bandpass filter 544b can be a 3GPP LTE FDD band 5 downlink bandpass filter (B5 DL). The switchable second-direction path 542b can comprise a bandpass filter 546b for passing a second selected second-direction band. The bandpass filter 546b can be a 3GPP LTE FDD band 26 downlink bandpass filter (B26 DL). The bandpass filter 544b and the bandpass filter 546b can be coupled to a switch 548b. The switch 548b can be coupled to another switch 550b.

The splitter 538b can be a directional coupler or combiner, and can be a multiport splitter (e.g. 3-way or 4-way). The splitter 538b can split the second direction into two paths: a channelized switchable second-direction parallel path 552b and a switchable second-direction parallel path 554b. The channelized switchable second-direction parallel path 552b can comprise a channelized second-direction bandpass filter 556b for a first subset of a first selected second-direction band. The bandpass filter 556b can be a 3GPP LTE FDD band 5 channel B downlink bandpass filter (5B DL). The selected second-direction band can be a 3GPP LTE FDD band 5 downlink. The first subset of the selected second-direction band can be channel B of the 3GPP LTE FDD band 5 downlink. The bandpass filter 556b can be coupled to a power detector 558b which can be coupled to a variable attenuator 560b. The variable attenuator 560b can be coupled to a combiner 562b. The combiner 562b can be coupled to the switch 550b.

The switchable second-direction parallel path 554b can comprise a switch 555b and can further comprise a channelized switchable second-direction parallel path 564b and a switchable second-direction path 566b. The channelized switchable second-direction parallel path 564b can comprise a channelized second-direction bandpass filter 568b for a second subset of a first selected second-direction band. The bandpass filter 568b can be a 3GPP LTE FDD band 5 channel A downlink bandpass filter (5A DL). The first selected second-direction band can be a 3GPP LTE FDD band 5 downlink. The second subset of the first selected second-direction band can be channel A of the 3GPP LTE FDD band 5 downlink. The switchable second-direction path 566b can comprise a filter 570b for passing the second subset of the first selected second-direction band and a first subset of a second selected second-direction band. The filter 570b can be a 3GPP LTE FDD band 5A+26 downlink bandpass filter (5A+26 DL). The first selected second-direction band can be a 3GPP LTE FDD band 5 downlink. The second subset of the first selected second-direction band can be channel A of the 3GPP LTE FDD band 5 downlink. The second selected second-direction band can be a 3GPP LTE FDD band 26 downlink. The first subset of the second selected second-direction band can be a channel delta of the 3GPP LTE FDD band 26 downlink. 3GPP LTE FDD band 5 downlink can include the frequencies 869 MHz through 894 MHz. 3GPP LTE FDD band 5 channel A downlink can include the frequencies 869 MHz through 880 MHz. 3GPP LTE FDD band 5 channel B downlink can include the frequencies 880 MHz through 890 MHz. 3GPP LTE FDD band 26 downlink can include the frequencies 859 MHz through 894 MHz. Channel delta of the 3GPP LTE FDD band 26 downlink can include the frequencies 859 MHz through 869 MHz.

The bandpass filter 568b and the filter 570b can be coupled to a switch 572b. The switch 572b can be coupled to a power detector 574b which can be coupled to a variable attenuator 576b. The variable attenuator 576b can be coupled to the combiner 562b. The combiner 562b can be coupled to the switch 550b.

The switch 550b can be coupled to an amplifier 578b which can be coupled to a variable attenuator 580b. The variable attenuator 580b can be coupled to a second-direction bandpass filter 582b. The second-direction bandpass filter 582b can be a 3GPP LTE FDD band 26 downlink bandpass filter (B26 DL). The second-direction bandpass filter 582b can be coupled to a power detector 584b. The power detector 584b can be coupled to a power amplifier 586b. The power amplifier 586b can be coupled to the first duplexer 506.

The repeater 500 can be configured for B26 and full B5 mode (e.g., in which UL filter banks A and B can operate) or parallel channelized mode (e.g., in which UL filter bank C can operate). Separate detectors can be used to identify the RSSI of band 5 channel A and band 5 channel B. The RSSI of band 26 and band 5 can be identified separately by switching to the desired filters filter banks A and B.

Figure 6:
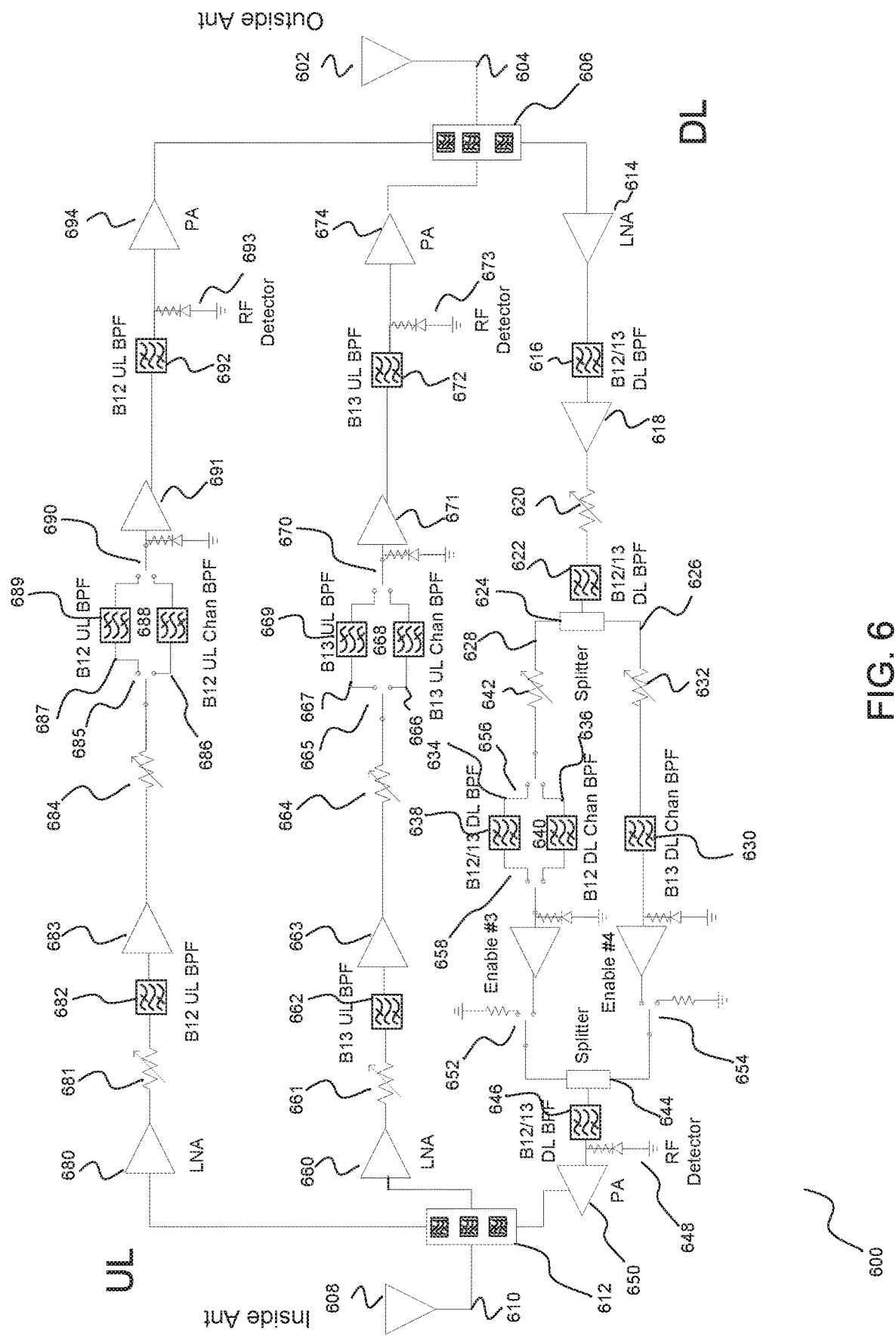
FIG. 6 illustrates a repeater for increasing signal booster gain from a weak-signal far node in the proximity of a strong-signal near node in accordance with an example.

FIG. 6 illustrates an example of a repeater 600 for increasing signal booster gain from a weak-signal far node in the proximity of a strong-signal near node. An outside antenna 602 can be coupled to a first interface port 604. The first interface port 604 can be coupled to a first multiplexer 606. An inside antenna 608 can be coupled to a second interface port 610. The second interface port 610 can be coupled to a second multiplexer 612.

The first multiplexer 606 can pass a signal in a first direction. The first direction can be a downlink direction or an uplink direction. The first direction can include a first low noise amplifier 614 that can be coupled to the first multiplexer 606. The first low noise amplifier 614 can be coupled to a dual bandpass filter 616 that can pass a selected dual-band of the first direction. The dual bandpass filter 616 can be coupled to an amplifier 618. The amplifier 618 can be coupled to a variable attenuator 620. The variable attenuator 620 can be coupled to an additional dual bandpass filter 622.

The additional dual bandpass filter 622 can be coupled to a splitter 624. The splitter 624 can be a directional coupler or combiner, and can be a multiport splitter (e.g. 3-way or 4-way). The splitter 624 can split the first direction into two paths: a first band-specific switchable first-direction parallel path 626 and a first switchable first-direction parallel path 628. The first band-specific switchable first-direction parallel path 626 can comprise a first first-direction bandpass filter 630 for a first band of the selected dual-band. The selected dual-band can be a third generation partnership project (3GPP) long term evolution (LTE) frequency division duplex (FDD) band 12 and 13 downlink. The first band of the selected dual-band can be 3GPP LTE FDD band 12 downlink or 13 downlink.

The first band-specific switchable first-direction parallel path 626 can further comprise a variable attenuator 632. The variable attenuator 632 can be coupled between the splitter 624 and the first first-direction bandpass filter 630.

The first switchable first direction parallel path 628 can comprise: a dual-band switchable first-direction path 634 and a second band-specific switchable first-direction parallel path 636. The dual-band switchable first-direction path 634 can comprise a second first-direction bandpass filter 638 for passing the selected dual-band. The selected dual-band can be 3GPP LTE FDD band 12 downlink and 13 downlink. The second band-specific switchable first-direction parallel path 636 can comprise a third first-direction bandpass filter 640 for a second band of the selected dual-band. The second band of the selected dual-band can be 3GPP LTE FDD band 12 downlink or 13 downlink.

The first switchable first direction parallel path 628 can further comprise a variable attenuator 642. The variable attenuator 642 can be coupled between the splitter 624 and the second first-direction bandpass filter 638 and the third first-direction bandpass filter 640.

A second splitter 644 can be coupled between the second interface port 610 and the first first-direction bandpass filter 630, the second first-direction bandpass filter 638, and the third first-direction bandpass filter 640. The second splitter 644 can be coupled to an additional dual bandpass filter 646 configured to pass a selected dual-band. The selected dual-band can be a 3GPP LTE FDD band 12 and 13 downlink. The additional dual bandpass filter 646 can be coupled to a radio frequency (RF) detector 648, which can be coupled to a power amplifier 650. The power amplifier 650 can be coupled to the second multiplexer 612, which can be coupled to the second interface port 610.

The repeater 600 can further comprise a first switch 652 for the first switchable first-direction parallel path 628. The first switch 652 can be coupled between the second splitter 644 and the second first-direction bandpass filter 638 and the third first-direction bandpass filter 640. The repeater 600 can further comprise a second switch 654 for the first band-specific switchable first-direction parallel path 626. The second switch 654 can be coupled between the second splitter 644 and the first first-direction bandpass filter 630.

The repeater 600 can further comprise a third switch 656. The third switch 656 can be coupled between the first splitter 624 and the second first-direction bandpass filter 638 and the third first-direction bandpass filter 640. The repeater 600 can further comprise a fourth switch 658. The fourth switch 658 can be coupled between the second first-direction bandpass filter 638 and the third first-direction bandpass filter 640, and the first switch 652.

The second multiplexer 612 can pass a signal in a second direction. The second direction can be an uplink direction or a downlink direction. The second direction can include a low noise amplifier 660 that can be coupled to a variable attenuator 661. The variable attenuator 661 can be coupled to a first second-direction bandpass filter 662. The first second-direction bandpass filter 662 can pass a first selected band of a second-direction signal. The first selected band can be a 3GPP LTE FDD band 12 uplink or 13 uplink. The selected band can also be one or more of a 3GPP LTE FDD band 1 to 76 uplink and 85 uplink. The first second-direction bandpass filter 662 can be coupled to an amplifier 663 which can be coupled to a variable attenuator 664. The variable attenuator 664 can be coupled to a first second-direction switch 665.

The first second-direction switch 665 can direct the second direction into two paths: a first channelized switchable second-direction parallel path 666 and a first switchable second-direction parallel path 667. The first channelized switchable second-direction parallel path 666 can be coupled to the first second-direction switch 665, and the first channelized switchable second-direction parallel path 666 can comprise a first channelized second-direction filter 668 for a first subset of the selected band. The selected band can be a 3GPP LTE FDD band 12 uplink or 13 uplink. The first switchable second-direction parallel path 667 coupled to the first second-direction switch 665 can comprise a second second-direction bandpass filter 669 for the first selected band. The selected band can be a 3GPP LTE FDD band 12 uplink or 13 uplink.

The repeater 600 can further comprise an additional second-direction switch 670. The additional second-direction switch 670 can be coupled between the first channelized second-direction filter 668 and the second second-direction bandpass filter 669 and an additional amplifier 671.

The additional amplifier 671 can be coupled to an additional bandpass filter 672 for the first selected band. The first selected band can be a 3GPP LTE FDD band 12 uplink or 13 uplink. The additional bandpass filter 672 can be coupled to a radio frequency (RF) detector 673, which can be coupled to a power amplifier 674. The power amplifier 674 can be coupled to the first multiplexer 606, which can be coupled to the first interface port 604.

The second multiplexer 612 can pass an additional signal in a second direction. The second direction can be an uplink direction or a downlink direction. The second direction can include a low noise amplifier 680 that can be coupled to a variable attenuator 681. The variable attenuator 681 can be coupled to a third second-direction bandpass filter 682. The third second-direction bandpass filter 682 can pass a second selected band of a second-direction signal. The second selected band can be a 3GPP LTE FDD band 12 uplink or 13 uplink. The selected band can also be one or more of a 3GPP LTE FDD band 1 to 76 uplink and 85 uplink. The third second-direction bandpass filter 682 can be coupled to an additional amplifier 683 which can be coupled to a variable attenuator 684. The variable attenuator 684 can be coupled to a second second-direction switch 685.

The second second-direction switch 685 can direct the second direction into two paths: a second channelized switchable second-direction parallel path 686 and a second switchable second-direction parallel path 687. The second channelized switchable second-direction parallel path 686 can be coupled to the second second-direction switch 685, and the second channelized switchable second-direction parallel path 686 can comprise a second channelized second-direction filter 688 for a second subset of the second selected band. The second selected band can be a 3GPP LTE FDD band 12 uplink or 13 uplink. The second switchable second-direction parallel path 687 can be coupled to the second second-direction switch 685 that can comprise a fourth second-direction bandpass filter 689 for the second selected band. The selected band can be a 3GPP LTE FDD band 12 uplink or 13 uplink.

The repeater 600 can further comprise an additional second-direction switch 690. The additional second-direction switch 690 can be coupled between the second channelized second-direction filter 688 and the fourth second-direction bandpass filter 689 and an additional amplifier 691.

The additional amplifier 691 can be coupled to an additional bandpass filter 692 for the second selected band. The second selected band can be a 3GPP LTE FDD band 12 uplink or 13 uplink. The additional bandpass filter 692 can be coupled to a radio frequency (RF) detector 693, which can be coupled to a power amplifier 694. The power amplifier 694 can be coupled to the first multiplexer 606, which can be coupled to the first interface port 604.

The repeater 600 can operate in wideband mode or parallel channelized mode (in which band 12 and band 13 can be adjusted separately). For wideband mode, the filter can be switched to the wideband BPF for UL and DL (i.e. B12 UL BPF, B13 UL BPF, and B12/13 DL BPF), and the downlink channelized filter can be disabled (i.e. B13 DL Chan BPF). The RSSI of band 12 and band 13 can be separately identified by disabling the undesired channel during signal detection. Alternatively, separate detectors can be used on each signal path. The switches in the repeater 600 can be one method of maintaining impedance matching to the splitter if any of Enable 1 through 4 are disabled. Another method includes operating B12/13 as full uplink and having the downlink switch between B12 or B13 BPFs, which can keep the passed band full but block the other band.

Figure 7:
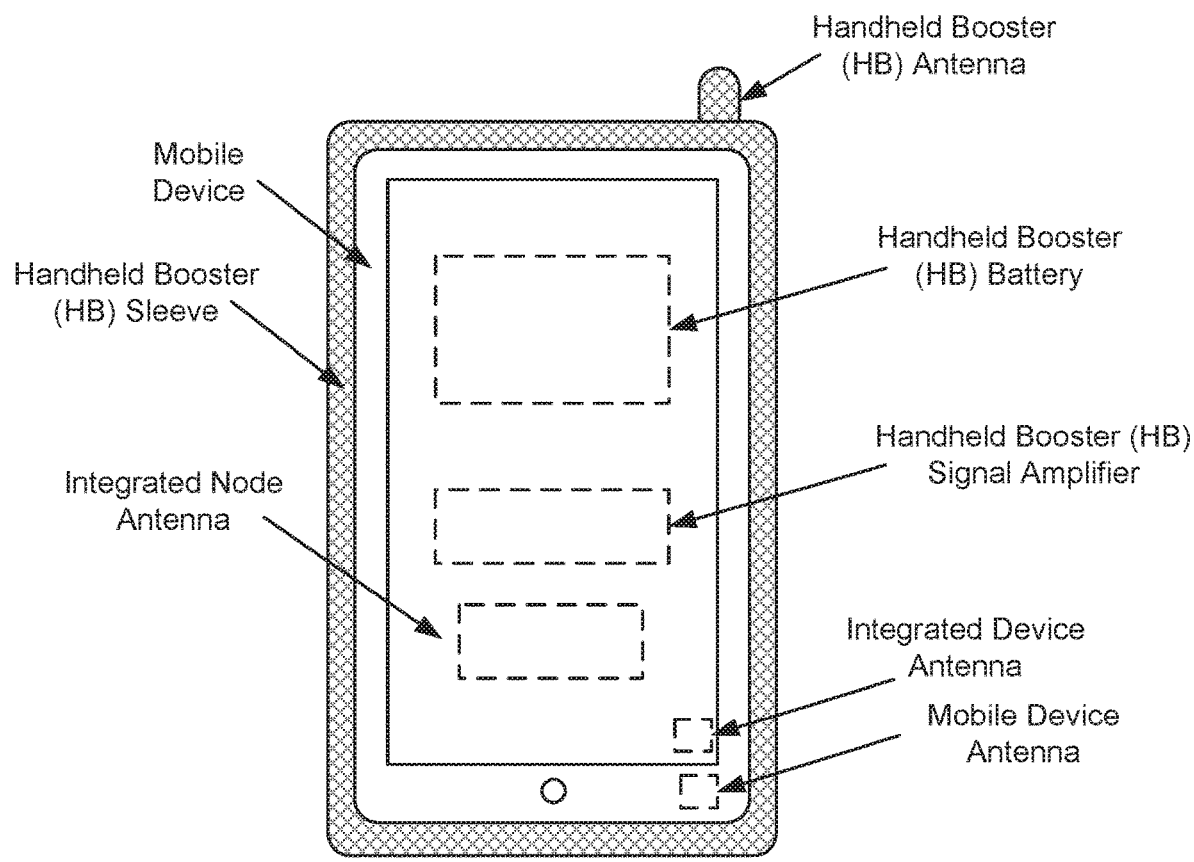
FIG. 7 illustrates a handheld booster in communication with a wireless device in accordance with an example.

While various embodiments described herein, and illustrated in FIGS. 1-6, have been described with respect to a cellular signal amplifier with an outside antenna and an inside antenna, this is not intended to be limiting. A repeater for increasing signal booster gain from a weak-signal far node in the proximity of a strong-signal near node can also be accomplished using a handheld booster, as illustrated in FIG. 7. The handheld booster can include an integrated device antenna and the integrated node antenna that are typically used in place of the indoor antenna and outdoor antenna, respectively.

Figure 8:
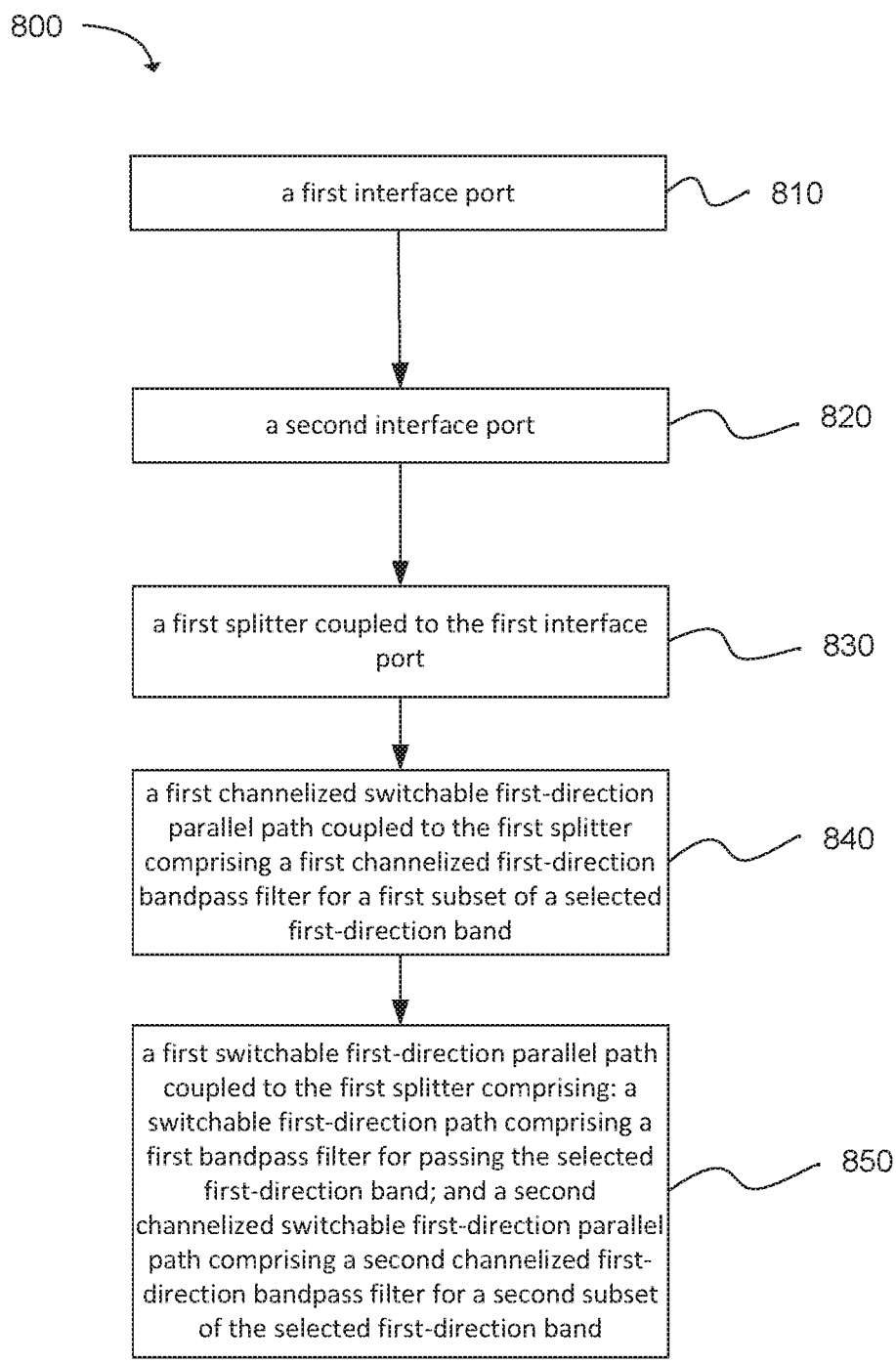
FIG. 8 depicts a repeater for increasing signal booster gain from a weak-signal far node in the proximity of a strong-signal near node in accordance with an example.

Another example provides an apparatus 800 of a repeater for increasing signal booster gain from a weak-signal far node in the proximity of a strong-signal near node, as shown in the flow chart in FIG. 8. The apparatus comprises a first interface port, as shown in block 810. The apparatus further comprises a second interface port, as shown in block 820. The apparatus further comprises a first splitter coupled to the first interface port, as shown in block 830. The apparatus further comprises a first channelized switchable first-direction parallel path coupled to the first splitter comprising a first channelized first-direction bandpass filter for a first subset of a selected first-direction band, as shown in block 840. The apparatus further comprises: a first switchable first-direction parallel path coupled to the first splitter comprising: a switchable first-direction path comprising a first bandpass filter for passing the selected first-direction band; and a second channelized switchable first-direction parallel path comprising a second channelized first-direction bandpass filter for a second subset of the selected first-direction band, as shown in block 850.

Figure 9:
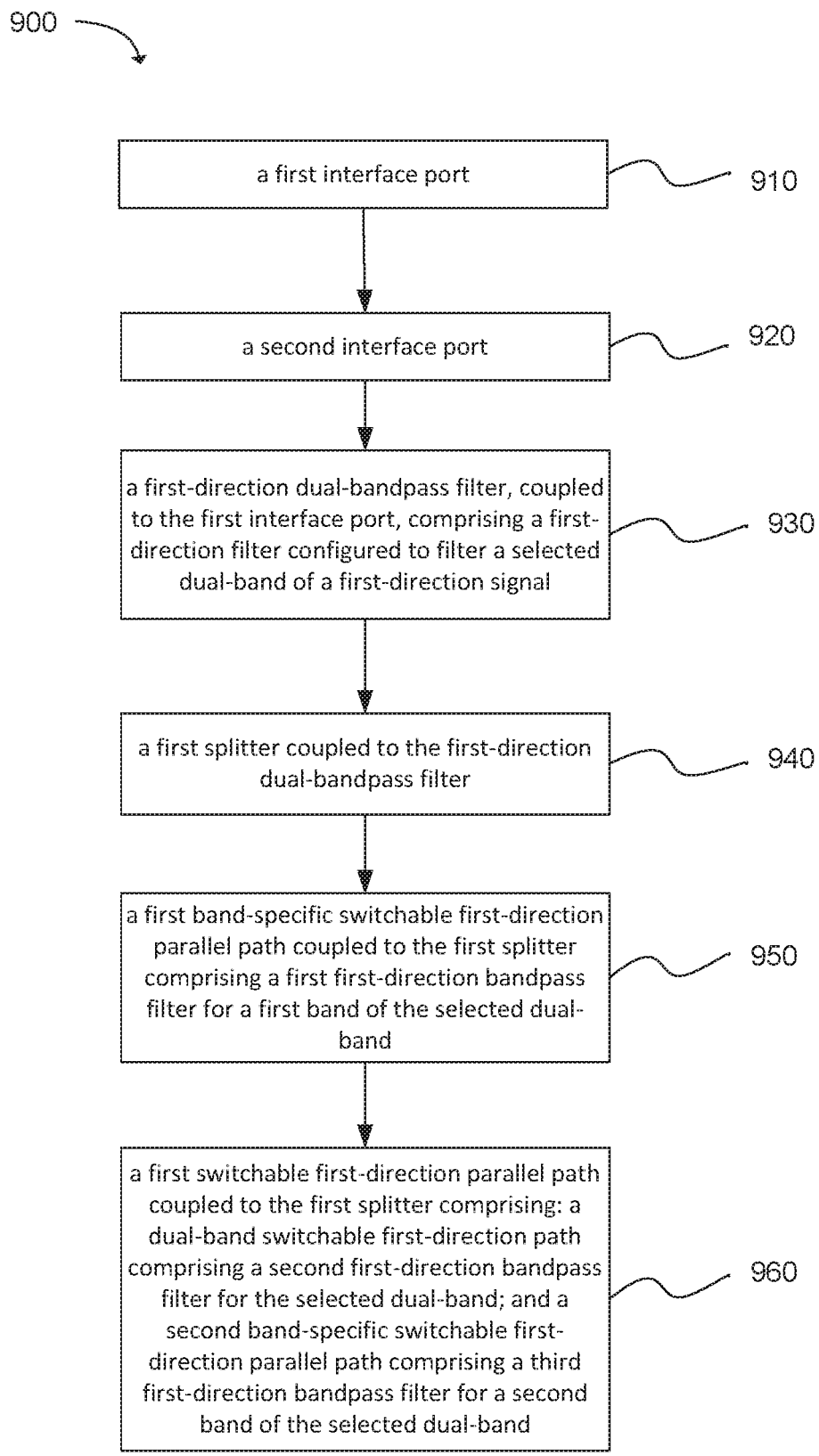
FIG. 9 depicts a repeater for increasing signal booster gain from a weak-signal far node in the proximity of a strong-signal near node in accordance with an example.

Another example provides an apparatus 900 of a repeater for increasing signal booster gain from a weak-signal far node in the proximity of a strong-signal near node, as shown in the flow chart in FIG. 9. The apparatus comprises a first interface port, as shown in block 910. The apparatus further comprises a second interface port, as shown in block 920. The apparatus further comprises a first-direction dual-bandpass filter, coupled to the first interface port, comprising a first-direction filter configured to filter a selected dual-band of a first-direction signal, as shown in block 930. The apparatus further comprises a first splitter coupled to the first-direction dual-bandpass filter, as shown in block 940. The apparatus further comprises a first band-specific switchable first-direction parallel path coupled to the first splitter comprising a first first-direction bandpass filter for a first band of the selected dual-band, as shown in block 950. The apparatus further comprises: a first switchable first-direction parallel path coupled to the first splitter comprising: a dual-band switchable first-direction path comprising a second first-direction bandpass filter for the selected dual-band; and a second band-specific switchable first-direction parallel path comprising a third first-direction bandpass filter for a second band of the selected dual-band, as shown in block 960.

Figure 10:
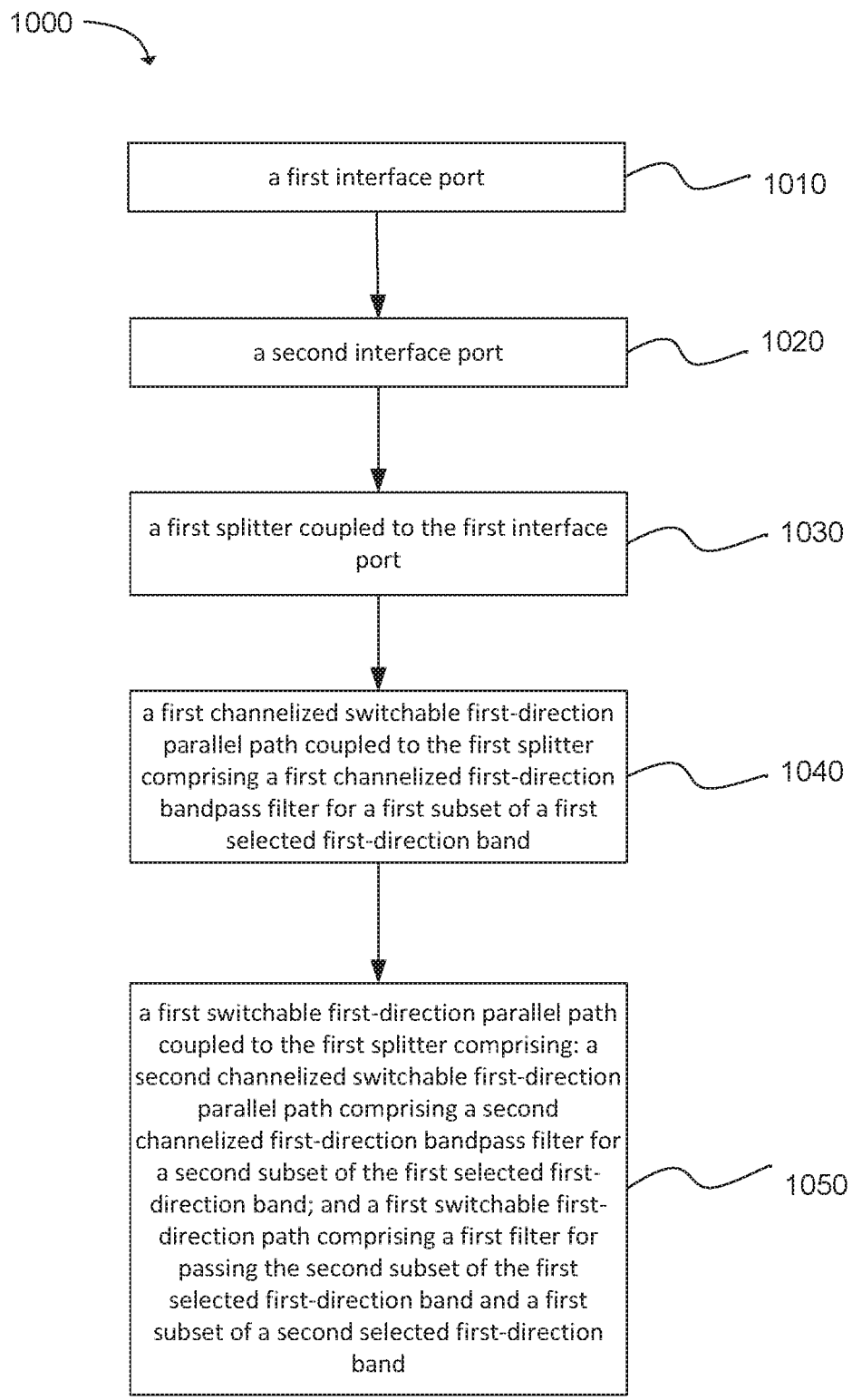
FIG. 10 depicts a repeater for increasing signal booster gain from a weak-signal far node in the proximity of a strong-signal near node in accordance with an example.

Another example provides an apparatus 1000 of a repeater for increasing signal booster gain from a weak-signal far node in the proximity of a strong-signal near node, as shown in the flow chart in FIG. 10. The apparatus comprises a first interface port, as shown in block 1010. The apparatus further comprises a second interface port, as shown in block 1020. The apparatus further comprises a first splitter coupled to the first interface port, as shown in block 1030. The apparatus further comprises a first channelized switchable first-direction parallel path coupled to the first splitter comprising a first channelized first-direction bandpass filter for a first subset of a first selected first-direction band, as shown in block 1040. The apparatus further comprises a first switchable first-direction parallel path coupled to the first splitter comprising: a second channelized switchable first-direction parallel path comprising a second channelized first-direction bandpass filter for a second subset of the first selected first-direction band; and a first switchable first-direction path comprising a first filter for passing the second subset of the first selected first-direction band and a first subset of a second selected first-direction band, as shown in block 1050.

EXAMPLES

The following examples pertain to specific technology embodiments and point out specific features, elements, or actions that can be used or otherwise combined in achieving such embodiments.

Example 1 includes a repeater for increasing signal booster gain from a weak-signal far node in the proximity of a strong-signal near node, the repeater comprising: a first interface port; a second interface port; a first splitter coupled to the first interface port; a first channelized switchable first-direction parallel path coupled to the first splitter comprising a first channelized first-direction bandpass filter for a first subset of a selected first-direction band; and a first switchable first-direction parallel path coupled to the first splitter comprising: a switchable first-direction path comprising a first bandpass filter for passing the selected first-direction band; and a second channelized switchable first-direction parallel path comprising a second channelized first-direction bandpass filter for a second subset of the selected first-direction band.

Example 2 includes the repeater of Example 1, the repeater further comprising: a second splitter coupled between the second interface port and the first bandpass filter, the second channelized first-direction bandpass filter, and the first channelized first-direction bandpass filter.

Example 3 includes the repeater of Example 2, the repeater further comprising: a first switch for the first switchable first-direction parallel path, wherein the first switch is coupled between: the second splitter; and the first bandpass filter and the second channelized first-direction bandpass filter; and a second switch for the first channelized switchable first-direction parallel path, wherein the second switch is coupled between: the second splitter; and the first channelized first-direction bandpass filter.

Example 4 includes the repeater of Example 3, the repeater further comprising: a third switch coupled between: the first splitter; and the first bandpass filter and the second channelized first-direction bandpass filter; a fourth switch coupled between: the first bandpass filter and the second channelized first-direction bandpass filter; and the first switch.

Example 5 includes the repeater of Example 1, the repeater further comprising: a first second-direction splitter coupled to the second interface port; a first channelized switchable second-direction parallel path coupled to the first second-direction splitter comprising a first channelized second-direction bandpass filter for a first subset of the selected second-direction band; and a first switchable second-direction parallel path coupled to the first second-direction splitter comprising: a switchable second-direction path comprising a second bandpass filter for passing the selected second-direction band; and a second channelized switchable second-direction parallel path comprising a second channelized second-direction bandpass filter for a second subset of the selected second-direction band.

Example 6 includes the repeater of Example 5, the repeater further comprising: a second second-direction splitter coupled between the first interface port and the first channelized second-direction bandpass filter, second bandpass filter, and the second channelized second-direction bandpass filter.

Example 7 includes the repeater of Example 6, the repeater further comprising: a first second-direction switch for the first switchable second-direction parallel path, wherein the first second-direction switch is coupled between: the second second-direction splitter; and the second bandpass filter and the second channelized second-direction bandpass filter; and a second second-direction switch for the first channelized switchable second-direction parallel path, wherein the second second-direction switch is coupled between: the second second-direction splitter; and the first channelized second-direction bandpass filter.

Example 8 includes the repeater of Example 7, the repeater further comprising: a third second-direction switch coupled between: the first second-direction splitter; and the second bandpass filter and the second channelized second-direction bandpass filter; a fourth second-direction switch coupled between: the second bandpass filter and the second channelized second-direction bandpass filter; and the first second-direction switch.

Example 9 includes the repeater of Example 1, the repeater further comprising: a first duplexer configured to be coupled to the first interface port; and a second duplexer configured to be coupled to the second interface port.

Example 10 includes the repeater of Example 9, the repeater further comprising: a first-direction bandpass filter, coupled to the first duplexer, comprising a first-direction filter configured to filter the selected first-direction band.

Example 11 includes the repeater of Example 1, wherein the selected first-direction band is a third generation partnership project (3GPP) long term evolution (LTE) frequency division duplex band 5 uplink.

Example 12 includes the repeater of Example 5, wherein the selected second-direction band is a third generation partnership project (3GPP) long term evolution (LTE) frequency division duplex band 5 downlink.

Example 13 includes the repeater of Example 1, wherein the selected first-direction band is selected as one or more of: a third generation partnership project (3GPP) long term evolution (LTE) band 1 to 76 uplink and 85 uplink.

Example 14 includes the repeater of Example 5, wherein the selected second-direction band is selected as one or more of: a third generation partnership project (3GPP) long term evolution (LTE) band 1 to 76 downlink and 85 downlink.

Example 15 includes the repeater of Example 5, wherein the first-direction is an uplink direction and the second-direction is a downlink direction.

Example 16 includes A repeater for increasing signal booster gain from a weak-signal far node in the proximity of a strong-signal near node, the repeater comprising: a first interface port; a second interface port; a first-direction dual-bandpass filter, coupled to the first interface port, comprising a first-direction filter configured to filter a selected dual-band of a first-direction signal; a first splitter coupled to the first-direction dual-bandpass filter; a first band-specific switchable first-direction parallel path coupled to the first splitter comprising a first first-direction bandpass filter for a first band of the selected dual-band; and a first switchable first-direction parallel path coupled to the first splitter comprising: a dual-band switchable first-direction path comprising a second first-direction bandpass filter for the selected dual-band; and a second band-specific switchable first-direction parallel path comprising a third first-direction bandpass filter for a second band of the selected dual-band.

Example 17 includes the repeater of Example 16, the repeater further comprising: a second splitter coupled between the second interface port and the first first-direction bandpass filter, second first-direction bandpass filter, and the third first-direction bandpass filter.

Example 18 includes the repeater of Example 17, the repeater further comprising: a first switch for the first switchable first-direction parallel path, wherein the first switch is coupled between: the second splitter; and the second first-direction bandpass filter and the third first-direction bandpass filter; and a second switch for the first band-specific switchable first-direction parallel path, wherein the second switch is coupled between: the second splitter; and the first first-direction bandpass filter.

Example 19 includes the repeater of Example 18, the repeater further comprising: a third switch coupled between: the first splitter; and the second first-direction bandpass filter and the third first-direction bandpass filter; and a fourth switch coupled between: the second first-direction bandpass filter and the third first-direction bandpass filter; and the first switch.

Example 20 includes the repeater of Example 16, the repeater further comprising: a first second-direction bandpass filter, coupled to the second interface port, comprising a second-direction filter configured to filter a first selected band of a second-direction signal; a first second-direction switch coupled to the first second-direction bandpass filter; a first channelized switchable second-direction parallel path coupled to the first second-direction switch comprising a first second-direction channelized bandpass filter for a channel of the first selected band; and a first switchable second-direction parallel path coupled to the first second-direction switch comprising a first second-direction path comprising a second second-direction bandpass filter for the first selected band.

Example 21 includes the repeater of Example 20, the repeater further comprising: a third second-direction bandpass filter, coupled to the second interface port, comprising a second-direction filter configured to filter a second selected band of a second-direction signal; a second second-direction switch coupled to the third second-direction bandpass filter; a second channelized switchable second-direction parallel path coupled to the second second-direction switch comprising a second second-direction channelized bandpass filter for a channel of the second selected band; and a second switchable second-direction parallel path coupled to the second second-direction switch comprising a second second-direction path comprising a fourth second-direction bandpass filter for the second selected band.

Example 22 includes the repeater of Example 16, the repeater further comprising: a first multiplexer configured to be coupled to the first interface port; and a second multiplexer configured to be coupled to the second interface port.

Example 23 includes the repeater of Example 16, wherein the selected dual-band is a third generation partnership project (3GPP) long term evolution (LTE) frequency division duplex band 12 and 13.

Example 24 includes the repeater of Example 16, wherein the first-direction is a downlink direction and the second-direction is an uplink direction.

Example 25 includes a repeater for increasing signal booster gain from a weak-signal far node in the proximity of a strong-signal near node, the repeater comprising: a first interface port; a second interface port; a first splitter coupled to the first interface port; a first channelized switchable first-direction parallel path coupled to the first splitter comprising a first channelized first-direction bandpass filter for a first subset of a first selected first-direction band; and a first switchable first-direction parallel path coupled to the first splitter comprising: a second channelized switchable first-direction parallel path comprising a second channelized first-direction bandpass filter for a second subset of the first selected first-direction band; and a first switchable first-direction path comprising a first filter for passing the second subset of the first selected first-direction band and a first subset of a second selected first-direction band.

Example 26 includes the repeater of Example 25, the repeater further comprising: a first combiner coupled between the second interface port and the first filter, the second channelized first-direction bandpass filter, and the first channelized first-direction bandpass filter.

Example 27 includes the repeater of Example 26, the repeater further comprising: a first switch coupled between: the first splitter; and the first filter and the second channelized first-direction bandpass filter; and a second switch coupled between: the first filter and the second channelized first-direction bandpass filter; and the first combiner.

Example 28 includes the repeater of Example 27, the repeater further comprising: a third switch coupled to the first interface port; a fourth switch coupled to the second interface port; a fifth switch coupled between the third switch and a first bandpass filter and a second bandpass filter; a sixth switch coupled between the fourth switch and the first bandpass filter and the second bandpass filter; and a second switchable first-direction parallel path coupled between the fifth switch and the sixth switch comprising: a second switchable first-direction path comprising the first bandpass filter for passing the second selected first-direction band; and a third switchable first-direction path comprising the second bandpass filter for passing the first selected first-direction band.

Example 29 includes the repeater of Example 28, the repeater further comprising: a third switchable first-direction parallel path coupled between the first interface port and the third switch comprising: a fourth switchable first-direction path comprising a third bandpass filter for passing the second selected first-direction band; and a fifth switchable first-direction path comprising a fourth bandpass filter for passing the first selected first-direction band.

Example 30 includes the repeater of Example 29, the repeater further comprising: a fifth bandpass filter coupled between the fourth switch and the second interface port, wherein the fifth bandpass filter is configured to pass the second selected first-direction band.

Example 31 includes the repeater of Example 25, the repeater further comprising: a second splitter coupled to the second interface port; a first channelized switchable second-direction parallel path coupled to the second splitter comprising a first channelized second-direction bandpass filter for a first subset of the first selected second-direction band; and a first switchable second-direction parallel path coupled to the second splitter comprising: a second channelized switchable second-direction parallel path comprising a second channelized second-direction bandpass filter for a second subset of the first selected second-direction band; and a first switchable second-direction path comprising a second filter for passing the second subset of the first selected second-direction band and a first subset of the second selected second-direction band.

Example 32 includes the repeater of Example 31, the repeater further comprising: a second combiner coupled between the first interface port and the second filter, the second channelized second-direction bandpass filter, and the first channelized second-direction bandpass filter.

Example 33 includes the repeater of Example 32, the repeater further comprising: a seventh switch coupled between: the second splitter; and the second filter and the second channelized second-direction bandpass filter; and an eighth switch coupled between: the second filter and the second channelized second-direction bandpass filter; and the second combiner.

Example 34 includes the repeater of Example 33, the repeater further comprising: a ninth switch coupled to the second interface port; a tenth switch coupled to the first interface port; an eleventh switch coupled between the ninth switch and a sixth bandpass filter and a seventh bandpass filter; a twelfth switch coupled between the tenth switch and the sixth bandpass filter and the seventh bandpass filter; and a second switchable second-direction parallel path coupled between the eleventh switch and the twelfth switch comprising: a second switchable second-direction path comprising the sixth bandpass filter for passing the second selected second-direction band; and a third switchable second-direction path comprising the seventh bandpass filter for passing the first selected second-direction band.

Example 35 includes the repeater of Example 34, the repeater further comprising: a third switchable second-direction parallel path coupled between the second interface port and the ninth switch comprising: a fourth switchable second-direction path comprising an eighth bandpass filter for passing the second selected second-direction band; and a fifth switchable second-direction path comprising a ninth bandpass filter for passing the first selected second-direction band.

Example 36 includes the repeater of Example 35, the repeater further comprising: a tenth bandpass filter coupled between the tenth switch and the first interface port, wherein the tenth bandpass filter is configured to pass the second selected second-direction band.

Example 37 includes the repeater of Example 25, the repeater further comprising: a first duplexer configured to be coupled to the first interface port; and a second duplexer configured to be coupled to the second interface port.

Example 38 includes the repeater of Example 25, wherein the first selected first-direction band is a third generation partnership project (3GPP) long term evolution (LTE) frequency division duplex band 5 uplink.

Example 39 includes the repeater of Example 25, wherein the second selected first-direction band is a third generation partnership project (3GPP) long term evolution (LTE) frequency division duplex band 26 uplink.

Example 40 includes the repeater of Example 25, wherein the first selected first-direction band or the second selected first-direction band is selected as one or more of: a third generation partnership project (3GPP) long term evolution (LTE) band 1 to 76 uplink and 85 uplink.

Example 41 includes the repeater of Example 31, wherein the first-direction is an uplink direction and the second-direction is a downlink direction.

Example 42 includes the repeater of Example 31, wherein the first selected second-direction band is a third generation partnership project (3GPP) long term evolution (LTE) frequency division duplex band 5 downlink.

Example 43 includes the repeater of Example 31, wherein the second selected second-direction band is a third generation partnership project (3GPP) long term evolution (LTE) frequency division duplex band 26 downlink.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The low energy fixed location node, wireless device, and location server can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A repeater for increasing signal booster gain from a weak-signal far node in the proximity of a strong-signal near node, the repeater comprising:
    a first interface port;
    a second interface port;
    a first splitter coupled to the first interface port;
    a first channelized switchable first-direction parallel path coupled to the first splitter comprising a first channelized first-direction bandpass filter for a first subset of a selected first-direction band; and
    a first switchable first-direction parallel path coupled to the first splitter comprising:
        a switchable first-direction path comprising a first bandpass filter for passing the selected first-direction band; and
        a second channelized switchable first-direction parallel path comprising a second channelized first-direction bandpass filter for a second subset of the selected first-direction band.

2. The repeater of claim 1, the repeater further comprising:
    a second splitter coupled between the second interface port and the first bandpass filter, the second channelized first-direction bandpass filter, and the first channelized first-direction bandpass filter.

3. The repeater of claim 2, the repeater further comprising:
    a first switch for the first switchable first-direction parallel path, wherein the first switch is coupled between:
        the second splitter; and
        the first bandpass filter and the second channelized first-direction bandpass filter; and
    a second switch for the first channelized switchable first-direction parallel path, wherein the second switch is coupled between:
        the second splitter; and
        the first channelized first-direction bandpass filter.

4. The repeater of claim 3, the repeater further comprising:
    A third switch coupled between:
        the first splitter; and
        the first bandpass filter and the second channelized first-direction bandpass filter;
    a fourth switch coupled between:
        the first bandpass filter and the second channelized first-direction bandpass filter; and
        the first switch.

5. The repeater of claim 1, the repeater further comprising:
- a first second-direction splitter coupled to the second interface port;
- a first channelized switchable second-direction parallel path coupled to the first second-direction splitter comprising a first channelized second-direction bandpass filter for a first subset of the selected second-direction band; and
- a first switchable second-direction parallel path coupled to the first second-direction splitter comprising:
  - a switchable second-direction path comprising a second bandpass filter for passing the selected second-direction band; and
  - a second channelized switchable second-direction parallel path comprising a second channelized second-direction bandpass filter for a second subset of the selected second-direction band.

6. The repeater of claim 5, the repeater further comprising:
- a second second-direction splitter coupled between the first interface port and the first channelized second-direction bandpass filter, second bandpass filter, and the second channelized second-direction bandpass filter.

7. The repeater of claim 6, the repeater further comprising:
- a first second-direction switch for the first switchable second-direction parallel path, wherein the first second-direction switch is coupled between:
  - the second second-direction splitter; and
  - the second bandpass filter and the second channelized second-direction bandpass filter; and
- a second second-direction switch for the first channelized switchable second-direction parallel path, wherein the second second-direction switch is coupled between:
  - the second second-direction splitter; and
  - the first channelized second-direction bandpass filter.

8. The repeater of claim 7, the repeater further comprising:
- a third second-direction switch coupled between:
  - the first second-direction splitter; and
  - the second bandpass filter and the second channelized second-direction bandpass filter;
- a fourth second-direction switch coupled between:
  - the second bandpass filter and the second channelized second-direction bandpass filter; and
  - the first second-direction switch.

9. The repeater of claim 1, the repeater further comprising:
- a first duplexer configured to be coupled to the first interface port;
- a second duplexer configured to be coupled to the second interface port; and
- a first-direction bandpass filter, coupled to the first duplexer, comprising a first-direction filter configured to filter the selected first-direction band.

10. The repeater of claim 1, wherein the selected first-direction band is a third generation partnership project (3GPP) long term evolution (LTE) frequency division duplex band 5 uplink.

11. The repeater of claim 5, wherein the selected second-direction band is a third generation partnership project (3GPP) long term evolution (LTE) frequency division duplex band 5 downlink.

\* \* \* \* \*